United States Patent [19]
Oh

[11] Patent Number: 5,557,335
[45] Date of Patent: Sep. 17, 1996

[54] TIME BASE CORRECTOR FOR VIDEO SIGNAL

[75] Inventor: Soon Y. Oh, Kyungki-do, Rep. of Korea

[73] Assignee: Goldstar Co., Ltd., Seoul, Rep. of Korea

[21] Appl. No.: 375,828

[22] Filed: Jan. 20, 1995

[30] Foreign Application Priority Data

Jan. 20, 1994 [KR] Rep. of Korea .................. 1070/1994

[51] Int. Cl.⁶ .................................................. H04N 5/95
[52] U.S. Cl. .................... 348/512; 358/339; 360/36.2
[58] Field of Search .................... 348/512; 358/320, 358/321, 337, 338, 339; 360/36.1, 36.2; H04N 5/95, 5/89

[56] References Cited

U.S. PATENT DOCUMENTS

| | | | |
|---|---|---|---|
| 4,802,026 | 1/1989 | Kaneko et al. | 358/339 |
| 4,864,422 | 9/1989 | Heitmann | 358/320 |
| 4,977,462 | 12/1990 | Takanashi et al. | 358/339 |
| 4,987,491 | 1/1991 | Kaite et al. | 358/340 |
| 5,218,449 | 6/1993 | Ko et al. | 358/320 |
| 5,260,839 | 11/1993 | Matsuta et al. | 358/339 |
| 5,280,396 | 1/1994 | Hamaguchi et al. | 360/36.1 |
| 5,400,148 | 3/1995 | Kashida et al. | 358/337 |

*Primary Examiner*—Safet Metjahic
*Assistant Examiner*—Chris Grant
*Attorney, Agent, or Firm*—Fish & Richardson PC

[57] ABSTRACT

A time base corrector for video signal is disclosed in which a phase-locked loop is formed for a chroma carrier of a video signal so that a difficulty in detecting a phase error from a horizontal sync signal at an accuracy similar to the chroma carrier, in the vertical sync section having no chroma carrier and complexity of hardware in which the phase difference between the horizontal sync and chroma carrier should be considered, are overcome by employing a high gain loop filter and a clearing operation. Further, a read clock modulation is performed exactly at a time delayed in a FIFO memory according to a speed error generated in one line, using properties in which frequency variation corresponds to phase integration in one line in the frequency conversion characteristic of the digital timing oscillator. This simplifies the read clock phase modulator.

27 Claims, 7 Drawing Sheets

TIME BASE CORRECTOR FOR VIDEO SIGNAL

BACKGROUND OF THE INVENTION

The present invention relates to a time base corrector for video signal, which corrects the change of time base contained in a video signal, and more particularly, to a time base corrector for video signal which forms a phase-locked loop to a chroma carrier and writes the result and modulates a read clock by using a difference of chroma carrier phase error between two serial lines to thereby compensate for a speed error.

Figure 1:
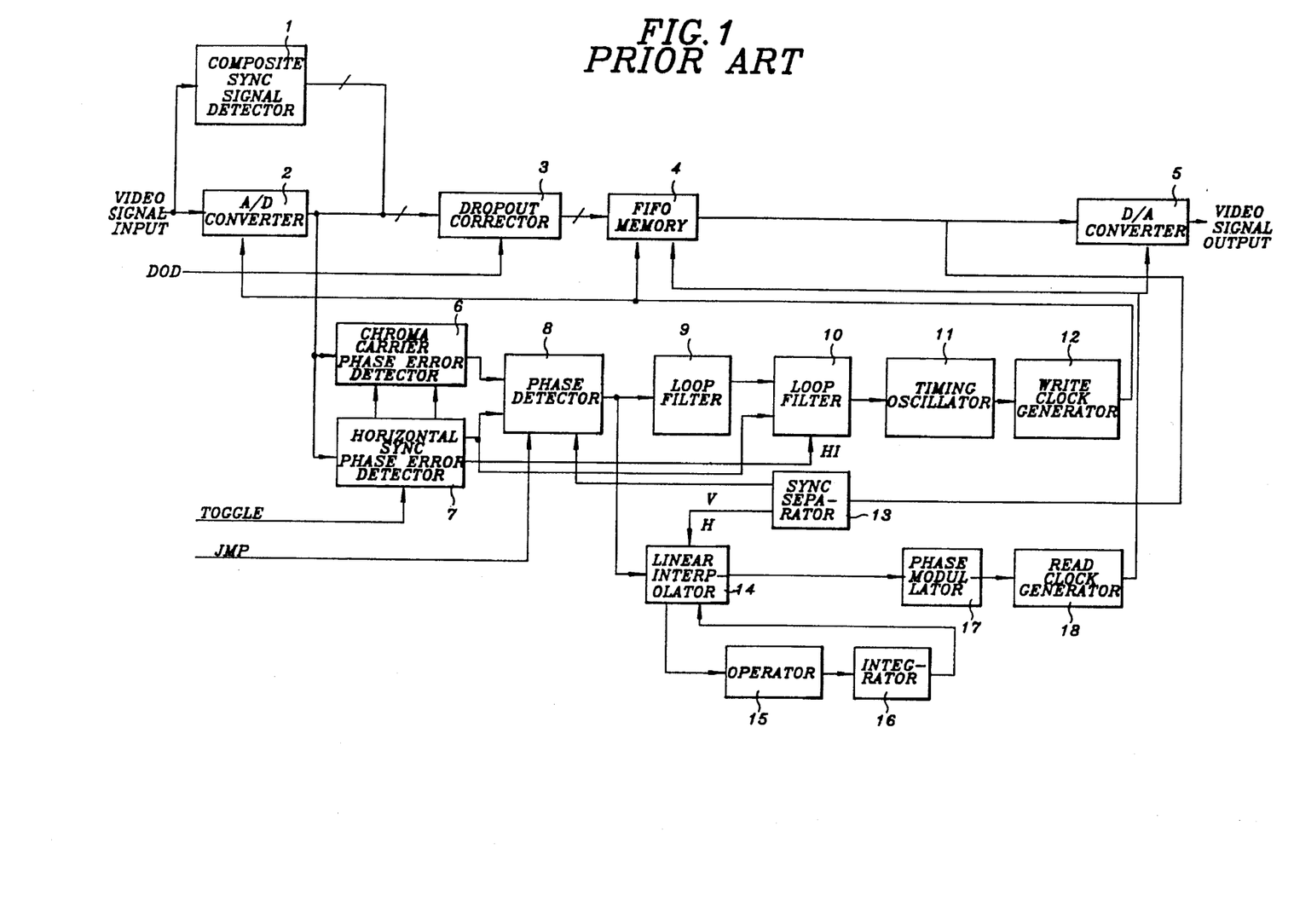
FIG. 1 is a block diagram of a conventional time base corrector for a video signal.

FIG. 1 is a block diagram of a conventional time base corrector.

As shown in FIG. 1, a conventional time base corrector comprises a composite sync signal detector 1 for detecting the sync signal of an input analog video signal, an A/D converter 2 for converting the input analog video signal into a digital signal, a dropout corrector 3 for conforming the timing of the digital video signal output from A/D converter 2 according to an externally input dropout detection signal DOD, a FIFO memory 4 for storing the output of dropout corrector 3, a D/A converter 5 for converting the output of FIFO memory 4 into an analog video signal, a horizontal sync phase error detector 7 for detecting the horizontal sync phase error of the signal output from A/D converter 2, a chroma carrier phase error detector 6 for detecting the chroma carrier phase error of the signal output from A/D converter 2 by using the signal output from horizontal sync phase error detector 7, a phase detector 8 for selecting one of the signal output from chroma carrier phase error detector 6 and the signal output from horizontal sync phase error detector 7, two loop filters 9 and 10 for filtering the signal output from phase detector 8, a timing oscillator 11 for conforming the timing of the signal output from loop filter 10, a write clock generator 12 for generating a sampling clock of A/D converter 2 and a write clock of FIFO memory 4 according to the signal output from time oscillator 11, a sync separator 13 for separating a sync signal from the signal output from FIFO memory 4 and supplying a vertical sync signal V to phase detector 8, a linear interpolator 14 for linearly interpolating a horizontal sync signal H output from sync separator 13 and the signal output from phase detector 8, an operator 15 for 1/455 operating the signal output from linear interpolator 14, an integrator 16 for integrating the signal output from operator 15 and outputting the integrated signal to linear interpolator 14, a phase modulator 17 for phase-modulating the signal output from linear interpolator 14, and a read clock generator 18 for generating a read clock of FIFO memory 4 and a sampling clock of D/A converter 5 by using the signal output from phase modulator 17.

The operation of the conventional time base corrector for video signal will be explained below.

An input analog video signal is converted into a digital video signal of 8 bits in A/D converter 2 by taking the clock fed from write clock generator 12 as the sampling clock.

A 1H-preceding value of the video signal digitally converted in A/D converter 2 is latched in dropout corrector 3 according to externally input dropout detection signal DOD. The timing of the video signal is conformed in consideration of the phenomenon that the phase of chroma carrier is inverted for every line. Here, composite sync signal detector 1 separates the composite sync signal from the input analog video signal and supplies the separated signal to dropout corrector 3.

FIFO memory 4 stores the signal output from dropout corrector 3 in conformity with the write clock output from write clock generator 12 and reads out the signal in conformity with the read clock output from read clock generator 18. The read-out signal is supplied to D/A converter 5. The digital video signal output from FIFO memory 4 is converted into an analog video signal in D/A converter 5 according to the clock output from read clock generator 18.

Here, if jitter is contained in the input video signal, there are suggested two methods of generating a write clock varied according to the jitter. One is to fix it to a horizontal sync signal; the other is to fix it to the chroma carrier. The conventional time base corrector for video signal selectively uses the two methods.

In other words, the video signal output from A/D converter 2 is input to chroma carrier phase error detector 6 and horizontal sync phase error detector 7 to detect the chroma carrier phase error and horizontal sync phase error. The detected errors are supplied to phase detector 8 and selectively output.

The selection of phase detector 8 is performed with a signal JMP input to externally and forcibly indicate that there is a large time base error to the video signal, and a separated vertical sync signal V output from sync separator 13. The selection of the phase detector is performed by considering that there is no chroma carrier in the vertical sync section, and considering a case externally and forcibly indicating that there is a large time base error to the video signal.

During the vertical sync section and in the case externally and forcibly indicating that there is a large time base error to the video signal, phase detector 8 selects the horizontal sync phase error output from horizontal sync phase error detector 7. Otherwise, the phase detector selects the chroma carrier phase error output from chroma carrier phase error detector 6.

Here, sync separator 13 separates horizontal sync signal H and vertical sync signal V from a time-base-corrected composite sync signal out of the signals output from FIFO memory 4. Vertical sync signal V is supplied to phase detector 8 and horizontal sync signal H to linear interpolator 14.

The low-frequency component of the signal output from phase detector 8 is gain-controlled in loop filter 9 and input to the rear loop filter 10 which performs phase correction and gain control.

Here, since the horizontal sync phase error detected from horizontal sync phase error detector 7 is abnormally large, loop filter 10 receives a priority signal HI given to select the signal output from horizontal sync phase error detector 7 so as to select one of the signal output from the front loop filter 9 and the signal output from horizontal sync phase error detector 7.

The signal output from loop filter 10 is input to digital timing oscillator 11 and digital timing oscillator 11 oscillates to the frequency signal corresponding to the phase error, which is then supplied to write clock generator 12.

Write clock generator 12 generates a 4 fsc clock according to the signal input from digital timing oscillator 11 and supplies the clock to A/D converter 2 and FIFO memory 4. The clock is used as a sampling clock or write clock.

Even though the video signal is sampled with the variable 4 fsc clock obtained by the phase-locked loop, there is left a speed error present in 1H. Therefore, the signal output from the present phase error detector 8 and the signal output from 1H-preceding phase error detector 8 are interpolated in linear interpolator 14.

The signal output from phase detector 8 is latched by lines in linear interpolator 14 according to the horizontal sync signal H output from sync separator 13. The phase difference between two lines is sent to 1/455 operator 15 made up of a memory to obtain 1/455 the phase difference between the lines. The obtained value is integrated in integrator 16 so that a value accumulated every two clocks of 4 fsc is fed back to linear interpolator 14.

Linear interpolator 14 adds the signal output from integrator 16 to the 1H-preceding phase error and outputs the result so that in 1H the preceding error value reaches the present error value.

The output of linear interpolator 14 is input to phase modulator 17 to obtain a signal phase-modulated in proportion to the speed error present in one horizontal line. The obtained signal is converted into a read clock and amplified in read clock generator 18, and then supplied as the read clock of FIFO memory 4 and the sampling clock of D/A converter 5.

However, such conventional time base corrector for video signal has the following drawbacks:

First, the output of chroma carrier phase error detector 6 and the output of horizontal sync phase error detector 7 are switched.

Specifically, most of video signals are not linear-phase-processed in which group delay is fixed, so that the phase difference between the horizontal sync signal and chroma carrier is out of 0 degree. In this case, the reference phases of chroma carrier phase error detector 6 and horizontal sync error detector 7 are different. If so, switching for every vertical sync increases remaining jitter in the vertical sync. In order to solve this problem, the phase-locked loop is formed by the horizontal sync in the vertical sync section. Further, there is required a circuit for phase correction in consideration of the phase difference between the horizontal sync signal and chroma carrier in switching to chroma carrier phase error, or a circuit for shifting a sampling reference which takes, as the reference, the output of chroma carrier phase error detector 6.

Second, it is not desirable to phase-modulate the read clock with a linear phase interpolated value for the purpose of speed compensation.

In forming a circuit for phase-modulating the read clock with the linear phase interpolated value for the purpose of speed compensation, a digital phase modulator having a different configuration form the digital timing oscillator for forming the write clock requires a 1/455 divider or ROM and an integrator for accumulating two clocks of 4 fsc.

SUMMARY OF THE INVENTION

Therefore, it is an object of the present invention to provide a time base corrector for video signal in which a phase-locked loop is formed for the chroma carrier of a video signal so that a difficulty in detecting a phase error from a horizontal sync signal at an accuracy similar to the chroma carrier in the vertical sync section having no chroma carrier and complexity of hardware in which the phase difference between the horizontal sync and chroma carrier should be considered are overcome by employing a high gain loop filter and a clearing operation.

It is another object of the present invention to provide a time base corrector for video signal in which a read clock modulation is performed exactly at a time delayed in a FIFO memory according to a speed error generated in one line, using properties in which frequency variation corresponds to phase integration in one line in the frequency conversion characteristic of a digital timing oscillator, to thereby simplify a read clock phase modulator.

To accomplish the objects of the present invention, there is provided a time base corrector for video signal comprising: an A/D converter for digitally converting an input analog video signal with a sampling clock which is a predetermined number of times the frequency of a chroma carrier signal; a dropout corrector for correcting the dropout of the digital video signal output from the A/D converter; a write timing generator for filtering the chroma carrier phase error according to the horizontal sync phase error of the digital video signal output from the A/D converter and generating a write clock which is then output as a sampling clock of the A/D converter; a FIFO memory for storing the digital video signal output from the dropout corrector according to the write clock output from said write timing generator and outputting the signal according to a read clock; a FIFO controller for controlling the read/write timing of the FIFO memory; and a D/A converter for converting the video signal output from the FIFO memory into an analog video signal.

BRIEF DESCRIPTION OF THE INVENTION

DETAILED DESCRIPTION OF THE INVENTION

Hereinafter, preferred embodiments of the present invention will be described with reference to the attached drawings.

Figure 2:
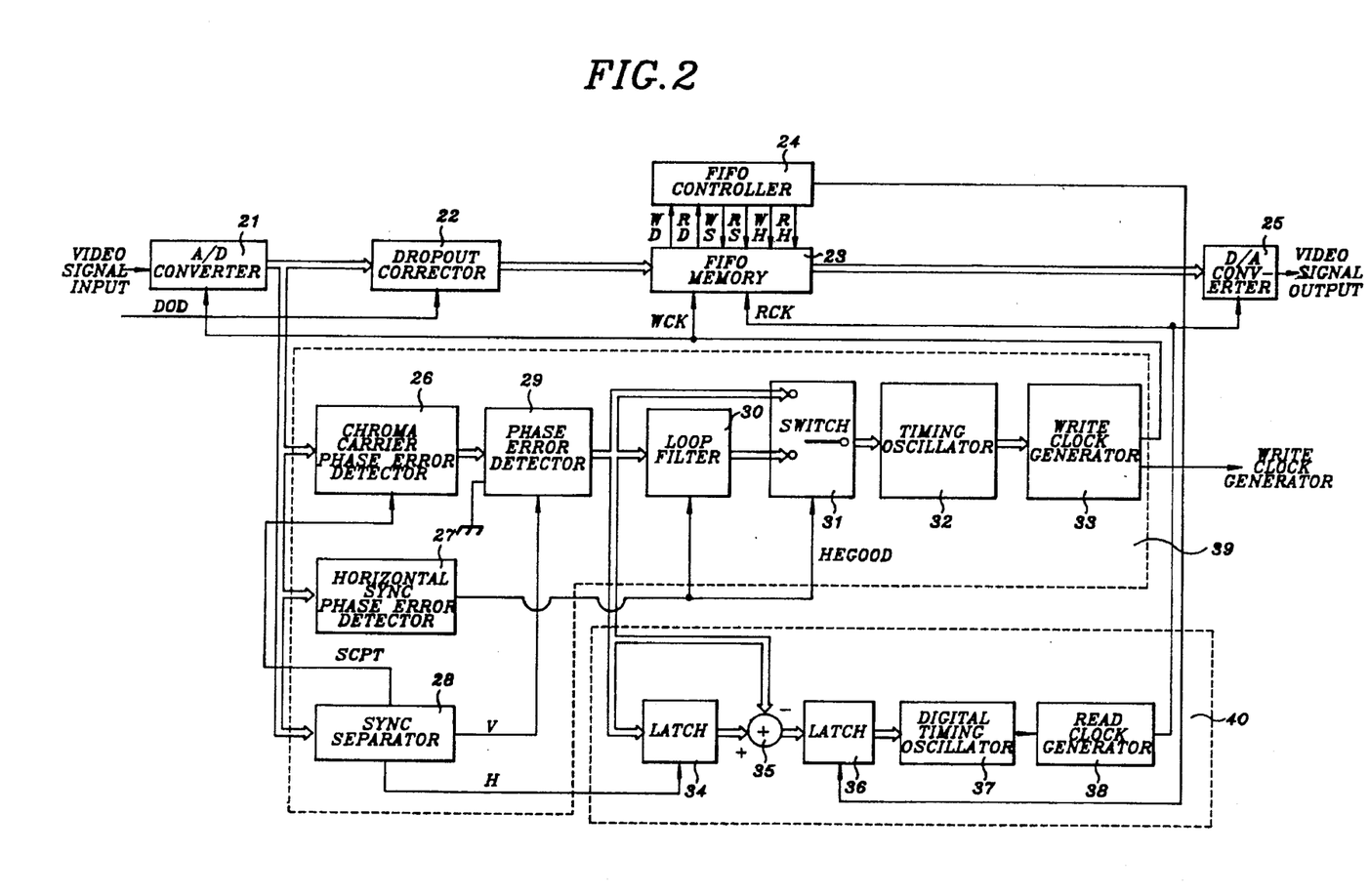
FIG. 2 is a block diagram of a time base corrector for a video signal of the present invention.

One embodiment of a time base corrector for video signal of the present invention, comprises, as shown in FIG. 2, an A/D converter 21, a dropout corrector 22, a FIFO memory 23, a FIFO controller 24, a D/A converter 25, and a write timing generator 39. In this embodiment, the change of time base of a video signal is corrected by establishing a read clock RCK of FIFO memory 23 as a fixed frequency.

A/D converter 21 digitally converts an input analog video signal with a sampling clock which is a predetermined number of times the frequency fsc of a chroma carrier signal output from write clock generator 39.

Dropout corrector 22 corrects the dropout of the digital video signal output from A/D converter 21 according to an externally input dropout detection signal DOD.

Write timing generator 39 comprises a horizontal sync phase error detector 27 for detecting the horizontal sync phase error of the digital video signal output from A/D converter 21 and outputting a control signal HEGOOD indicating that the error between serial horizontal lines falls within a predetermined range, a sync separator 28 for separating the horizontal sync signal H and vertical sync signal V of the digital video signal output from A/D converter 21 and generating a timing signal SCPT indicating that a chroma carrier starts, a chroma carrier phase error detector 26 for detecting a phase error between the chroma carrier and the sampling clock of the digital video signal output from A/D converter 21 by using timing signal SCPT output from sync separator 28, a phase error detector 29 for outputting "0" during a vertical sync period and selecting and outputting the signal output from chroma carrier phase error detector 26 out of the vertical sync period, according to vertical sync signal V output from sync separator 28, a loop filter 30 cleared according to control signal HEGOOD output from horizontal sync phase error detector 27 and for filtering the signal output from phase error detector 29, a switching portion 31 for selecting one of the signals output from phase error detector 29 and loop filter 30 according to control signal HEGOOD output from horizontal sync error detector 27, a timing oscillator 32 for performing frequency conversion according to the signal output from switching portion 31 and providing a write clock timing, and a write clock generator 33 for generating a write clock WCK according to the signal output from timing oscillator 32 and outputting the clock as the sampling clock of A/D converter 21 and as the write clock of FIFO memory 23. With these circuits, the write timing generator filters the chroma carrier phase error according to the horizontal sync phase error of the digital video signal output from A/D converter 21 and generates write clock WCK which is then output as the sampling clock of A/D converter 21 and the write clock WCK of FIFO memory 23. Here, loop filter 30 is made with an infinite impulse response filter.

FIFO memory 23 stores the digital video signal output from dropout corrector 22 according to write clock WCK output from write clock generator 33 of write timing generator 39 and outputs the signal to D/A converter 25 according to a fixed read clock RCK.

FIFO controller 24 controls the read/write timing of FIFO memory 23.

D/A converter 25 converts the video signal output from FIFO memory 23 into an analog video signal. Here, read clock RCK is fixed to 4 fsc frequency and write clock WCK is 4 fsc frequency so that the change of time base of video signal is corrected.

The operation of the above-described embodiment of the time base corrector for video signal of the present invention will be explained below.

An analog video signal containing jitter is converted into a digital video signal in A/D converter 21 according to sampling clock WCK output from write clock generator 33. The digitally converted signal is dropout-corrected in dropout corrector 22 on basis of externally detected dropout detection signal DOD.

At the same time when dropout-correcting the digital video signal output from A/D converter 21, dropout corrector 22 delays the digital video signal for about 1H and stores it in FIFO memory 23 under the control of FIFO controller 24 in synchronization with write clock WCK output from write clock generator 33.

The digital video signal stored in FIFO memory 23 is read out under the control of FIFO controller 24 by fixed read clock RCK and is converted into a time-base-corrected analog video signal by read clock RCK in D/A converter 25.

The digital video signal output from A/D converter 21 is input to horizontal sync phase error detector 27 so that a phase error between the horizontal sync and sampling clock WCK is detected. At the same time, the difference between 1H is obtained so that a control signal HEGOOD for deciding that the time of the horizontal sync period falls within a predetermined range is output. Control signal HEGOOD is fed as a selection control signal of switching portion 31 and as a clear signal of loop filter 30.

The digital video signal output from A/D converter 21 is supplied to sync separator 28 and then separated into vertical sync signal V and horizontal sync signal H. The thus separated vertical sync signal V is fed as the selection control signal of phase error detector 29.

Sync separator 28 outputs a timing signal SCPT indicating that the chroma carrier starts after a predetermined time from the falling edge of the horizontal sync signal. The timing signal SCPT is supplied to chroma carrier phase error detector 26.

Chroma carrier phase error detector 26 detects a phase error between the video signal and sampling clock WCK by using the digital video signal output from A/D converter 21 and timing signal SCPT output from sync separator 28.

More specifically, with timing signal SCPT output from sync separator 28 and a clock in which 4 fsc sampling clock WCK is divided by four, $\sin\theta$ of phase error $\theta$ between the chroma carrier of the video signal and sampling clock WCK is six-period-averaged for the chroma carrier period. With a clock having a 90 degree phase difference from the divided-by-four clock, that is, a clock having a 90 degree phase difference from the clock in which 4 fsc sampling clock WCK is divided by four, $\cos\theta$ of phase difference $\theta$ between the chroma carrier of the video signal and sampling clock is 6-period-averaged for the chroma carrier period. $\sin\theta$ and $\cos\theta$ are used to calculate phase difference $\theta$ which is provided to phase error detector 29.

Figure 3A:
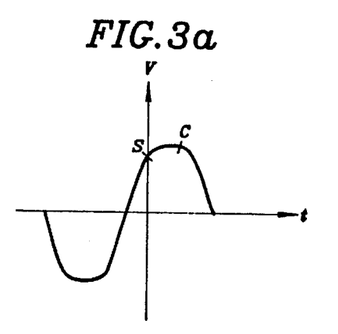
FIGS. 3A and 3B are timing diagrams showing the phase relation between a sampling clock and a chroma carrier.
Figure 3B:
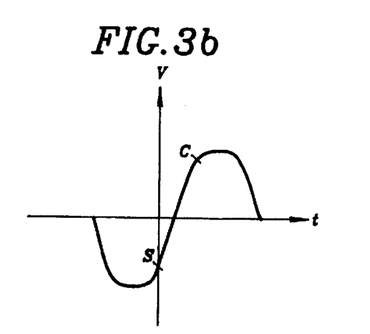

FIGS. 3A and 3B show the phase relation between the sampling clock and chroma carrier. FIG. 3A shows the phase relation between sine sample S and cosine sample C when the phase of sampling clock WCK is later, with FIG. 3B showing the the phase relation between sine sample S and cosine sample C when the phase of sampling clock WCK is earlier.

One input of phase error detector 29 is a value output from chroma carrier error detector 26. The other input thereof is "0." Vertical sync signal V separated in sync separator 28 is used as the selection control signal of the two inputs. While vertical sync signal V is input, there is no chroma carrier in phase error detector 29 so that phase error detection by the chroma carrier is impossible. In this case, input "0" is selected and therefore the phase error is output as "0." While vertical sync signal is not input, phase error detector 29 selects and outputs an error value output from chroma carrier phase error detector 26.

The signal output from phase error detector 29 becomes one input of loop filter 30 and switching portion 31. Loop filter amplifies the low-frequency component of the phase error input from phase error detector 29 to a sufficient gain. The amplified component is input to the other side of switching portion 31. Switching portion 31 performs switching according to control signal HEGOOD output from horizontal sync error detector 27.

Specifically, horizontal sync error detector 27 outputs control signal HEGOOD indicating a case when the phase error between serial lines is greater than a predetermined value and deviates from a phase error detection range of the chroma carrier, that is, ±180 degrees. When control signal HEGOOD is input as a signal indicating the case when the error deviates from the phase error detection range by the chroma carrier, that is, ±180 degrees, switching portion 31 selects a signal output from phase error detector 29 and having not passed through loop filter 30 for the small gain. The switching portion outputs the selected signal without change and at the same time clears loop filter 30 according to control signal HEGOOD.

When control signal HEGOOD is input as a signal indicating that the phase error between serial lines is below a predetermined value and the phase error detection by the chroma carrier is enabled, switching portion 31 selects and outputs the signal output from loop filter 30 and in which the low-frequency component of the phase error is amplified to a sufficient gain.

The error detection signal selected and output by switching portion 31 according to control signal HEGOOD output from horizontal sync phase error detector 27 is input to timing oscillator 32 for a complete phase-locked loop.

Timing oscillator 32 performs frequency conversion corresponding to the phase error detection signal output from switching portion 31 and outputs the result to write clock generator 33. Write clock generator 33 generates 4 fsc write clock WCK under the control of timing oscillator 32 and outputs the clock to A/D converter 21 and FIFO memory 23.

In the time base corrector for video signal of the present invention in which write clock WCK is generated and read clock RCK is fixed to 4 fsc, the jitter contained in the input analog video signal is suppressed.

Another embodiment of the time base corrector for video signal of the present invention which is designed to removed a speed error present in one line, in addition to the components of the first embodiment, further comprises a read timing generator 40 for compensating for the speed error according to horizontal sync signal H output from sync separator 28 under the control of FIFO controller 24 and the signal output from phase error detector 29 and modulating and outputting read clock RCK to FIFO memory 23.

More specifically, the second embodiment of the time base corrector for video signal of the present invention, as shown in FIG. 2, comprises A/D converter 21, dropout corrector 22, FIFO memory 23, FIFO controller 24, D/A converter 25, write timing generator 39, and read timing generator 40. The respective components are the same as those of the first embodiment in configuration. The second embodiment of the time base corrector of the present invention is to compensate for speed error and uses a method of modulating read clock RCK in order to remove remaining jitter.

Here, read timing generator 40 comprises a latch 34 for storing a phase error previous to 1H output from phase error detector 29 according to horizontal sync signal H output from sync separator 28, a subtractor 35 for subtracting the present phase error output from phase error detector 29 from the 1H-preceding phase error output from latch 34, a latch 36 for latching the signal output from subtractor 35 under the control of FIFO controller 24 and storing a phase error between lines, a digital timing oscillator 37 for performing frequency conversion according to the signal output from latch 36 and providing a read clock timing, and a read clock generator 38 for generating a read clock RCK under the control of the signal output from digital timing oscillator 37 and outputting the clock as the read clock of FIFO memory 23 and as the sampling clock of D/A converter 25.

The operation of the second embodiment of the time base corrector for video signal will be presented below centering on read timing generator 40.

The output of phase error detector 29 represents remaining jitter so that, if the remaining jitter is obtained by the intervals of 1H, the variation of jitter present in one line can be noted.

In other words, latch 34 latches the output of 1H-preceding phase error detector 29 by taking, as the input, horizontal sync signal H output from sync separator 28. Subtractor 35 subtracts the present phase error output from the latched 1H-preceding phase error. The subtraction result is stored in latch 36.

Latch 36 latches the signal output from subtractor 35 by taking, as the input, timing control signal RML output from FIFO controller 24.

Timing control signal RML has the relation with the depth of FIFO memory 23 and is generated in consideration with a time delayed from the input to the output of the video signal to/from FIFO memory 23.

The signal output from latch 36 is input to digital timing oscillator 37 which then performs frequency conversion corresponding to the signal output from latch 36. The frequency converted signal is output to read clock generator 38. Read clock generator 38 generates read clock RCK under the timing control of digital timing oscillator 37 and supplies the clock to FIFO memory 23 and D/A converter 25.

In modulating read clock RCK, digital timing oscillator 37 is driven by subtracting the present phase error from the 1H-preceding phase error because time must be considered for read clock RCK contrary to write clock WCK.

In the case when the chroma carrier is sampled as shown in FIG. 3A, the sampling clock falls behind the phase of chroma carrier of the video signal. If the chroma carrier is sampled as shown in FIG. 3B, the sampling clock goes ahead of the phase of the chroma carrier.

In order to correct the phase error for write clock WCK, the sampling clock frequency should advance in positive phase detection as shown in FIG. 3A. In negative phase detection, the sampling clock frequency should retreat, as shown in Fig. 3B.

However, if the video signal sampled as shown in FIGS. 3A and 3B and stored in FIFO memory 23 is read out with a fixed clock, the remaining jitter is not removed.

In the case of FIG. 3A, when read clock RCK retreats and is output to D/A converter 25, the remaining jitter is removed. In the case of FIG. 3B, read clock RCK advances and is output to D/A converter 25, the remaining jitter is removed.

The detailed configuration and operation of the components constituting the first and second embodiments of the time base corrector for video signal of the present invention will be explained below with the attached drawings.

Figure 4:
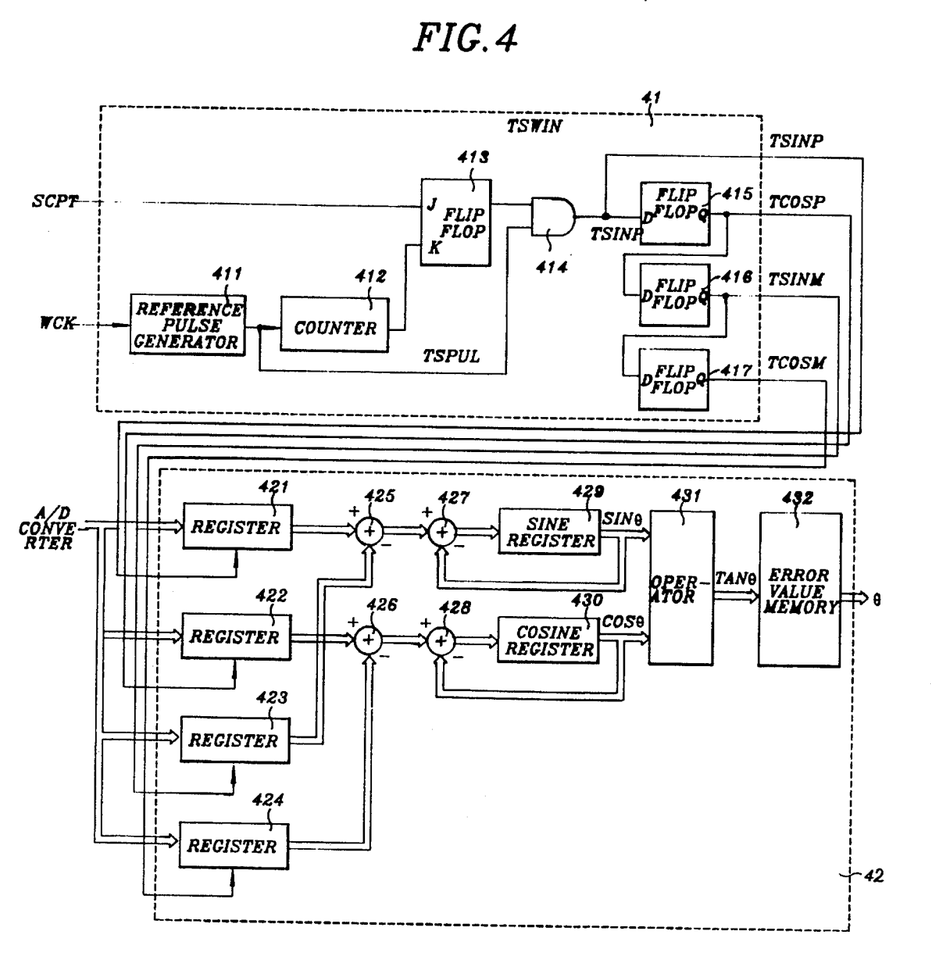
FIG. 4 is a detailed block diagram of the chroma carrier phase error detector shown in FIG. 2.

Chroma carrier phase error detector 26 of FIG. 2 comprises, as shown in FIG. 4, a pulse detector 41 for generating first and second sine and cosine sample pulse signals TSINP, TSINM, TCOSP and TCOSM sequentially delayed from timing signal SCPT output from sync separator 28 and the sampling clock of A/D converter 21, and a phase error detector 42 for operating the first and second sine and cosine sample pulse signals TSINP, TSINM, TCOSP and TCOSM output from pulse detector 41 and obtaining sine and cosine phase differences to thereby generate a final phase error $\theta$ between the digital chroma carrier and sampling clock output from A/D converter 21.

Here, pulse detector 41 comprises a reference pulse generator 411 for dividing sampling clock WCK of A/D converter 21 by four and generating a reference chroma carrier signal TSPUL, a counter 412 for counting reference chroma carrier signal TSPUL output from reference pulse generator 411 for every six periods, a flip-flop 413 for receiving the signal output from counter 412 and timing signal SCPT output from sync separator 28 and outputting a section pulse signal TSWIN indicative of a section during which the error is detected, an AND gate 414 for logically multiplying section pulse signal TSWIN output from flip-flop 413 by reference chroma carrier signal TSPUL output from reference pulse generator 411 and outputting a first sine sample pulse signal TSINP, a flip-flop 415 for delaying first sine sample pulse signal TSINP output from AND gate 414 for one clock and outputting a first cosine sample pulse signal TCOSP, a flip-flop 416 for delaying first cosine sample pulse signal TCOSP output from flip-flop 415 for one clock and outputting second sine sample pulse signal TSINM, and a flip-flop 417 for delaying second sine sample pulse signal TSINM output from flip-flop 416 for one clock and outputting second cosine sample pulse signal TCOSM.

Phase error detector 42 comprises a register 421 for storing the digital chroma carrier sine sample output from A/D converter 21 according to first sine sample pulse signal TSINP output from pulse detector 41, a register 422 for storing the digital chroma carrier cosine sample output from A/D converter 21 according to first cosine sample pulse signal TCOSP output from pulse detector 41, a register 423 for storing the digital chroma carrier sine sample output from A/D converter 21 according to second sine sample pulse signal TSINM output from pulse detector 41, a register 424 for storing the digital chroma carrier cosine sample output from A/D converter 21 according to second cosine sample pulse signal TCOSM output from pulse detector 41, a subtractor 425 for subtracting the output from register 423 from the output from register 421, a subtractor 426 for subtracting the output of register 424 from the output of register 422, an adder 427 for adding the output of subtractor 425 as one input, an adder 428 for adding the output of subtractor 426 as one input, a sine register 429 for storing the output of adder 427 and outputting it as the other input of adder 427, a cosine register 430 for storing the output of adder 428 and outputting it as the other input of adder 428, an operator 431 for dividing the output of sine register 429 and the output of cosine register 430 and converting the result into a tangent value, and an error memory 432 for calculating and storing the final error value $\theta$ by using the output of operator 431.

The operation of chroma carrier phase error detector 26 will be described with reference to FIGS. 5A–5G.

Figure 5A:
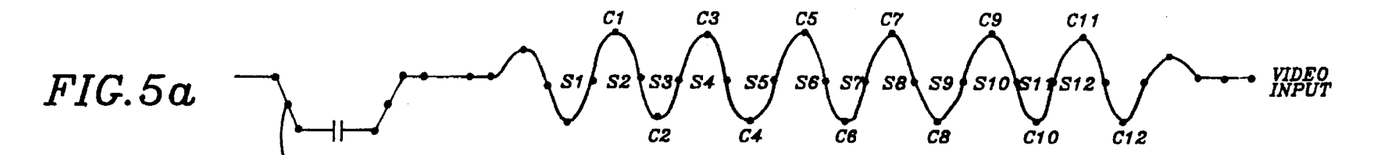
FIGS. 5A–5G are diagrams of waveforms present at the respective components of FIG. 2.
Figure 5B:
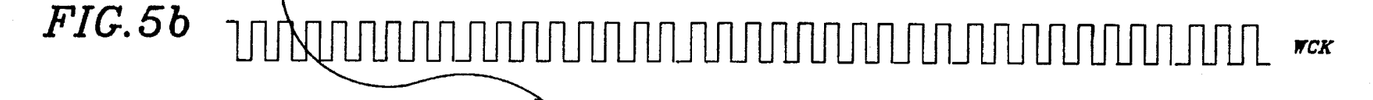
Figure 5C:
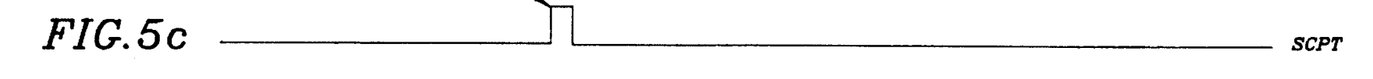

FIG. 5A indicates sample points C1–C12 and S1–S12 sampled with sampling clock WCK shown in FIG. 5B in the chroma carrier section of the digital video signal output from A/D converter 21. FIG. 5B shows sampling clock WCK. FIG. 5C shows a timing signal SCPT input from sync separator 28.

The sampling clock (shown in FIG. 5B) and timing signal (shown in FIG. 5C) are input to pulse detector 41 to thereby generate four sample pulses, that is, first and second sine and cosine sample pulse signals TSINP, TSINM, TCOSP and TCOSM.

Figure 5D:
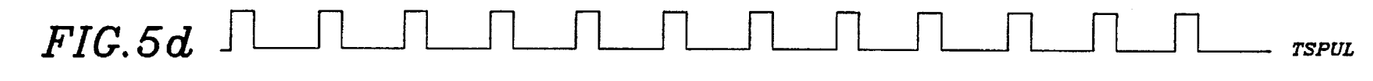

First, sampling clock WCK (shown in FIG. 5B) is input to reference pulse generator 411 and forms reference chroma carrier signal TSPUL in which sampling clock WCK of 4 fsc is divided by four, as shown in FIG. 5D.

Reference chroma carrier signal TSPUL (shown in FIG. 5D) is supplied to AND gate 414 and to counter 412 so that one pulse is output for every six pulses. The counting result of counter 412 is supplied to the K input of flip-flop 413.

Figure 5E:
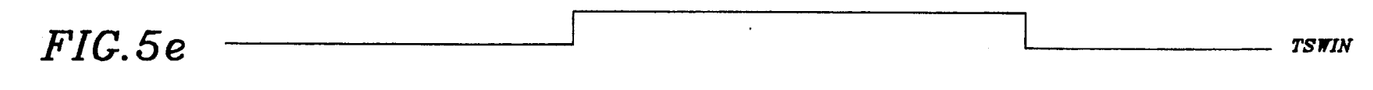

Timing signal SCPT which counts a predetermined number of clocks from the falling edge of the horizontal sync signal as showing in FIG. 5C and thus indicates that the chroma carrier starts is input to the j input of flip-flop 413. When timing signal SCPT (shown in FIG. 5C) is input, the output TSWIN of flip-flop 413 becomes HIGH as shown in FIG. 5E. Thereafter, at the moment when six pulses of reference chroma carrier signal TSPUL (shown in FIG. 5D) are input, the output of flip-flop 413 becomes LOW by the output of counter 412.

Figure 5F:
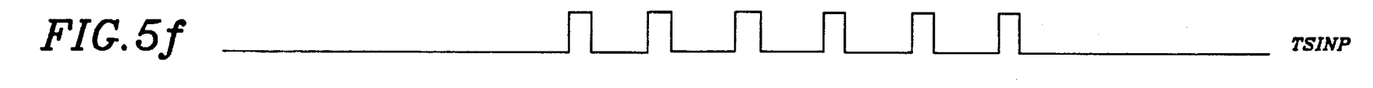

While the output of flip-flop 413 stays HIGH and when reference chroma carrier signal TSPUL (shown in FIG. 5D) is input, for reference chroma carrier signal TSPUL (shown in FIG. 5D), first sine sample pulse signal TSINP is output from AND gate 414, as shown in FIG. 5F. In other words, the pulses of the chroma carrier phase error detection section, that is, six pulses of reference chroma carrier signal TSPUL while the output TSWIN of flip-flop 413 stays HIGH, are output as first sine sample pulse signal TSINP.

Figure 5G:
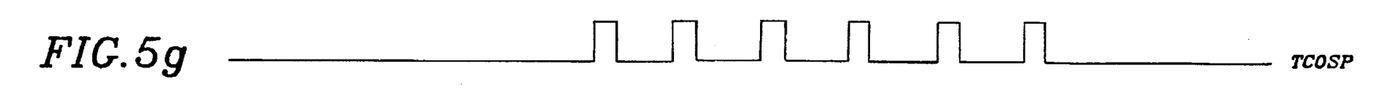

First sine sample pulse signal TSINP (shown in FIG. 5F) is input to flip-flop 415 and delayed for one period of sampling clock WCK. The delayed signal is output as first cosine sample pulse signal TCOSP as shown in FIG. 5G. First cosine sample pulse signal TCOSP output from flip-flop 415 is re-input to flip-flop 416 and delayed for one period of sampling clock WCK. The delayed signal is output as second sine sample pulse signal TSINM. Second sine sample pulse signal TSINM output from flip-flop 416 is input to flip-flop 417, delayed for one period of sampling clock WCK and output as second cosine sample pulse signal TCOSM.

The four sample pulses, that is, first and second sine and cosine sample pulse signals TSINP, TSINM, TCOSP and TCOSM, are input as storage control signals to registers 421, 422, 423 and 424 of phase error detector 42, respectively.

Register 421 stores digital chroma carrier sine sample S1 of FIG. 5A at the timing when first sine sample pulse signal TSINP of FIG. 5F is input. Register 422 stores digital chroma carrier cosine sample C1 of FIG. 5A at the timing when first cosine sample pulse signal TCOSP of FIG. 5G is input. Register 423 stores digital chroma carrier sine sample S2 of FIG. 5A at the timing when second sine sample pulse signal TSINM is input. Register 424 stores digital chroma carrier cosine sample C2 of FIG. 5A at the timing when second cosine sample pulse signal TCOSM is input.

Such operations are repeated whenever a sample pulse is input and subsequent sample values S3–S12 and C3–C12 are stored sequentially.

Sine sample S1 stored in register 421 and sine sample S2 stored in register 423 are subtracted (S1–S2) in subtractor 425. The subtraction result is added to the output of sine register 429 whose initial value is "0" in adder 427, and stored in sine register 429.

With respect to subsequently input sine samples S3 and S4, subtraction is performed in subtractor 425. The subtraction result is added to the output (sinθ=S1−S2) of sine register 429 in adder 427. The addition result [(S1−S2)+(S3−S4)] is stored in sine register 429. These operations are also performed with respect to the remaining sine samples S5−S12. The value sinθ finally output from sine register 429 is $$sinθ=(Si−S2)+(S3−S4)+(S5−S6)+(S7−S8)+(S9−S10)+(S11−S12)$$

Cosine sample C1 stored in register 422 and cosine sample C2 stored in register 424 are subtracted (C1−C2) in subtractor 426. The subtraction result is added to the output of cosine register 430 whose initial value is "0" in adder 428 and stored in cosine register 430.

With respect to subsequently input cosine samples C3 and C4, subtraction (C3−C4) is performed by subtractor 426. The subtraction result is added to the output (cosθ=C1−C2) of cosine register 430 in adder 428. The added result [(C1−C2)+(C3−C4)] is stored in cosine register 430.

Such operations are performed in the same manner with respect to the remaining cosine samples C5−C12. The value cosθ finally output from cosine register 430 is $$cosθ=(C1−C2)+(C3−C4)+(C5−C6)+(C7−C8)+(C9−C10)+(C11−C12)$$

Sine error sinθ and cosine error cosθ output from sine register 429 and cosine register 430 are divided in operator 431 and converted into a tangent value (tanθ=sinθ/cosθ). The thus converted tangent value is input to error memory 432.

Error memory 432 is a ROM for storing an arc tangent value with respect to tangent value tanθ output from operator 431. The error memory outputs final error θ corresponding to an input value.

The error output from chroma carrier phase error detector 26 is input to phase error detector 29.

Figure 6:
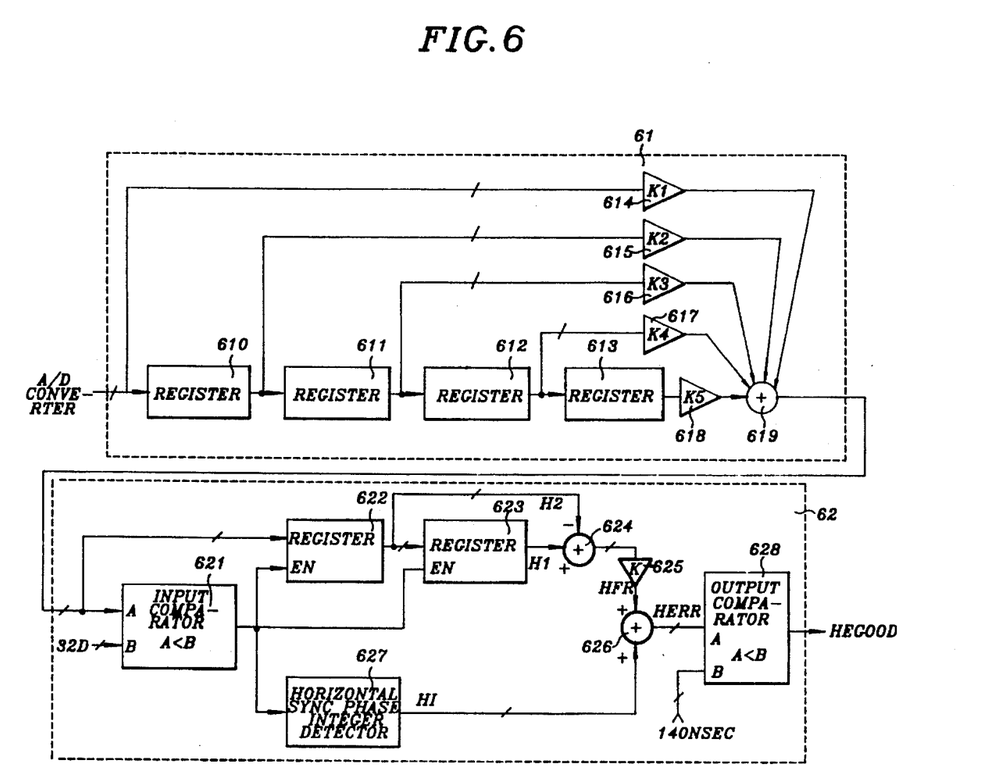
FIG. 6 is a detailed block diagram of the horizontal sync phase error detector of FIG. 2.

As shown in FIG. 6, horizontal sync phase error detector 27 of FIG. 2 comprises a horizontal sync low-pass filter 61 for performing the low-pass filtering the horizontal sync signal with respect to the digital video signal output from A/D converter 21, and an error discriminator 62 for receiving the signal output from horizontal sync low-pass filter 61 and detecting the horizontal sync phase error to thereby decide whether the error falls within a permissible range or not and to output control signal HEGOOD. Here, horizontal sync low-pass filter 61 is formed with a fifth finite impulse response filter.

Horizontal sync low-pass filter 61 comprises a register 610 for storing and delaying the horizontal sync signal of the digital video signal output from A/D converter 21, a register 611 for storing and delaying the horizontal sync signal output from register 610, a register 612 for storing and delaying the horizontal sync signal output from register 611, a register 613 for storing and delaying the horizontal sync signal output from register 612, a tab counter 614 for multiplying the horizontal sync signal of the digital video signal output from A/D converter 21 by a predetermined constant K1, a tab counter 615 for multiplying the horizontal sync signal output from register 610 by a predetermined constant K2, a tab counter 616 for multiplying the horizontal sync signal output from register 611 by a predetermined constant K3, a tab counter 617 for multiplying the horizontal sync signal output from register 612 by a predetermined constant K4, a tab counter 618 for multiplying the horizontal sync signal output from register 613 by a predetermined constant K4, and an adder 619 for adding the signals output from tab counters 614, 615, 616, 617, 618 and outputting the added signals to error discriminator 62.

Error discriminator 62 comprises an input comparator 621 for comparing the signal output from horizontal sync low-pass filter 61 with a reference sample value, a register 622 for storing the signal output from horizontal sync low-pass filter 61 by taking the signal output from input comparator 621 as an enable signal EN, a register 623 for storing the signal output from register 622 by taking the signal output from input comparator 621 as an enable signal EN, a subtractor 624 for subtracting the output of register 622 of the output from register 623, a multiplier 625 for multiplying the output of subtractor 624 by a predetermined constant K, a horizontal sync phase integer detector 627 for counting the signal output from input comparator 621 and detecting a horizontal sync phase integer, an adder 626 for adding the output of multiplier 625 to the output of horizontal sync detector 627 and outputting a horizontal error, and an output comparator 628 for outputting control signal HEGOOD in which the output of adder 626 is compared with a reference value of permissible error to switching portion 31 and loop filter 30.

The operation of horizontal sync phase error detector 27 will be explained with reference to FIGS. 7A−7D.

For a normal video signal of 4.2 MHz band, the falling edge of the horizontal sync signal is 140 nsec±20 nsec in time width. If this is sampled with sampling clock WCK (4 fsc), the sample point is as shown in FIGS. 7A and 7B.

Figure 7A:
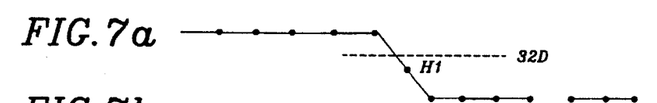
FIGS. 7A–7D are diagrams of waveforms present at the respective components of FIG. 6.
Figure 7B:
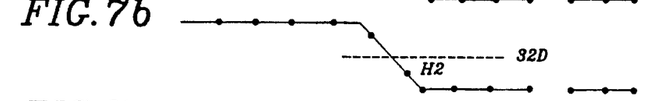

FIGS. 7A and 7B show 1H-preceding falling edge waveform and the present falling edge waveform which have not passed through horizontal sync low-pass filter 61. These waveforms indicate sample points sampled at 4 fsc.

Here, 32 D (decimal) is a reference value for detecting the horizontal sync signal. If the first sample below 32 D is sampled to H1 in FIG. 7A prior to 1H and the present sample value is sampled to H2 in FIG. 7B, phase error can be detected at a resolution below 70 nsec by (H1−H2)×K(K is integer).

Since the falling edge of the horizontal sync signal has a small number of samples and there should be considered an effect due to noise, the falling edge passes through low-pass filter 61 formed with the fifth finite impulse response filter so that the number of samples increases at the falling edge of the horizontal sync signal as shown in FIGS. 7A and 7B. Then, the first sample values HL1 and HL2 sampled below reference level 32 D as mentioned above are used to detect the decimal error (below 70 nsec) of the horizontal sync.

Figure 7C:
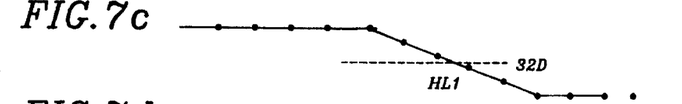
Figure 7D:
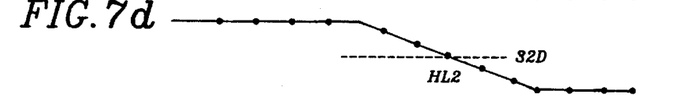

FIG. 7C shows the waveform of 1H-preceding falling edge having passed through horizontal sync low-pass filter 61. Fig. 7D is the waveform of the present falling edge having passed through horizontal sync low-pass filter 61. The digital video signal output from A/D converter 21 passes through registers 610, 611, 612 and 613 sequentially and is delayed in units of sample. The input digital video signal and the samples delayed in registers 610, 611, 612 and 613 are multiplied by tab coefficients K1, K2, K3, K4 and K5, respectively, and added and low-pass filtered in adder 619.

Horizontal sync signal sample value HLPF low-pass filtered in low-pass filter 61 is input to one input A of input comparator 621 of error discriminator 62 and to register 622.

Input comparator 621 compares reference value 32 D(A) and sample value HLPF(A) output from adder 619 of low-pass filter 61 and outputs the comparison result (A<B). The comparison result is input to the enable ports of registers 622 and 623, and simultaneously input to horizontal sync phase integer detector 627 for the purpose of counting up.

When sampling is performed below reference 32 D, input comparator 621 stores the sampling result to registers 622 and 623 in units of 1H. Signal H2 output from register 622 is subtracted from signal H1 output from register 623 in subtractor 624. The subtraction result is multiplied by integer K in multiplier 625 and then supplied to adder 626 as the decimal portion HFR of the horizontal sync phase error.

Horizontal sync phase integer detector 627 counts the signal output from input comparator 621 and supplies integer error HI which detects 70 nsec resolution to adder 626.

Adder 626 adds decimal portion HFR of the horizontal sync phase error output from multiplier 625 to integer error HI output from horizontal sync phase integer detector 627 to thereby obtain horizontal sync phase error HERR. The thus obtained error is input to one input port A of output comparator 628.

Output comparator 628 compares horizontal sync phase error HERR output from adder 626 and reference value 140 nsec (B). If horizontal phase error HERR is below reference value 140 nsec, control signal HEGOOD indicating that the phase error detection of chroma carrier is enabled is output.

Control signal HEGOOD output from output comparator 628 clears loop filter 30 and controls the switching of switching portion 31.

Figure 8:
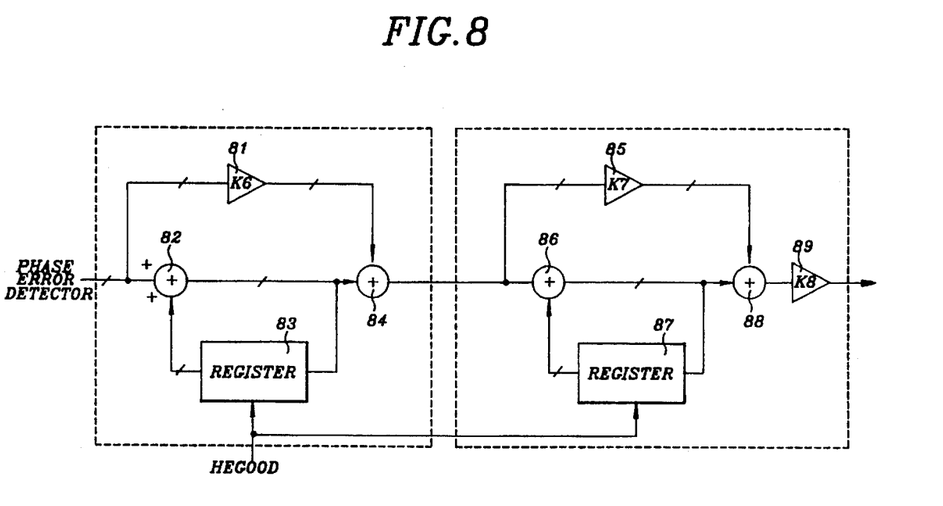
FIG. 8 is a detailed block diagram of the loop filter of FIG. 2.

Loop filter 30 of FIG. 2 comprises a multiplier 81 for multiplying the signal output from phase error detector 29 by a predetermined constant K6, an adder 82 for adding the signal output from phase error detector 29 as one input, a register 83 cleared according to control signal HEGOOD output from horizontal sync phase error detector 27 and for storing and delaying the output of adder 82 for a predetermined time and outputting the delayed result to the other input of adder 82, an adder 84 for adding the output of multiplier 81 to the output of adder 82, a multiplier 85 for multiplying the output of adder 84 by a predetermined constant K7, an adder 86 for adding the output of adder 84 as one input, a register cleared according to control signal HEGOOD output from horizontal sync phase error detector 27 and for storing and delaying the output of adder 86 for a predetermined time and outputting the delayed result to the other input of adder 86, an adder 88 for adding the output of multiplier 85 to the output of adder 86, and a multiplier 89 for multiplying the output of adder 88 by a predetermined constant K8 and the multiplied result to switching portion 31.

The operation of loop filter 30 constructed as above will be described with reference to FIG. 9.

Figure 9:
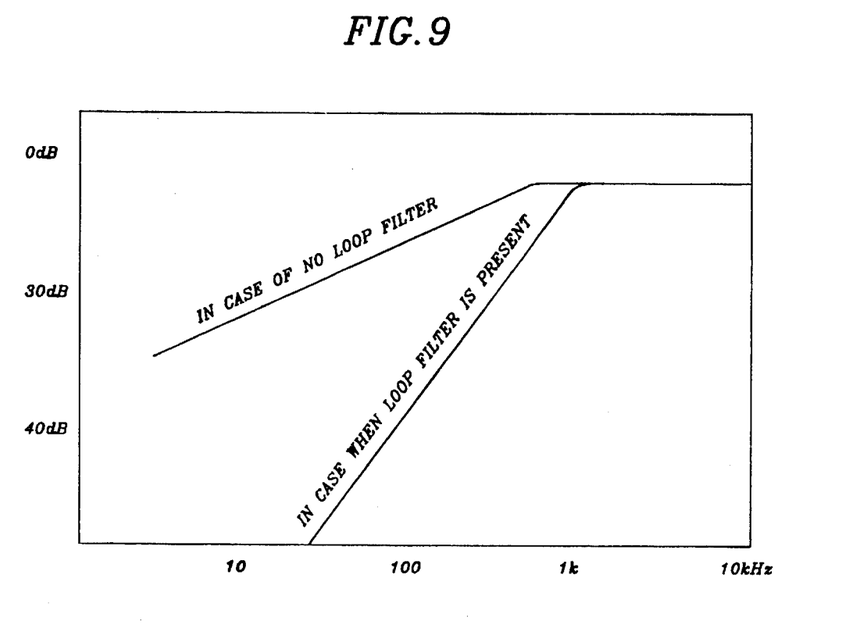
FIG. 9 is a graph showing a phase error transmission characteristic in accordance with the loop filter of FIG. 8.

Loop filter 30 has the phase error transmission characteristic shown in FIG. 9 so that the gain of the low-frequency component of the input phase error detection signal is raised.

Adder 82 and register 83 perform the delay and feedback of the input signal. The result of delay and feedback is added to the output of multiplier 81 and filtered in adder 84. The result filtered at the front stage is delayed and fed back by the rear adder 86 and register 87. The addition result of the fed back signal is added to the output of multiplier 85 in adder 88 and multiplied by constant K8 in multiplier 89 of the output port. The multiplication result is output as the result filtered by the transfer function characteristic shown in Fig. 9.

The output phase error detection signal is input to switching portion 32 and the error detection signal output from switching portion 31 by control signal HEGOOD output from horizontal sync phase error detector 27 is input to timing oscillator 32, forming a complete phase-locked loop. This allows a synchronization range not to deviate greatly even when the phase error detection by the chroma carrier is not carried out precisely in a vertical sync section.

Figure 10:
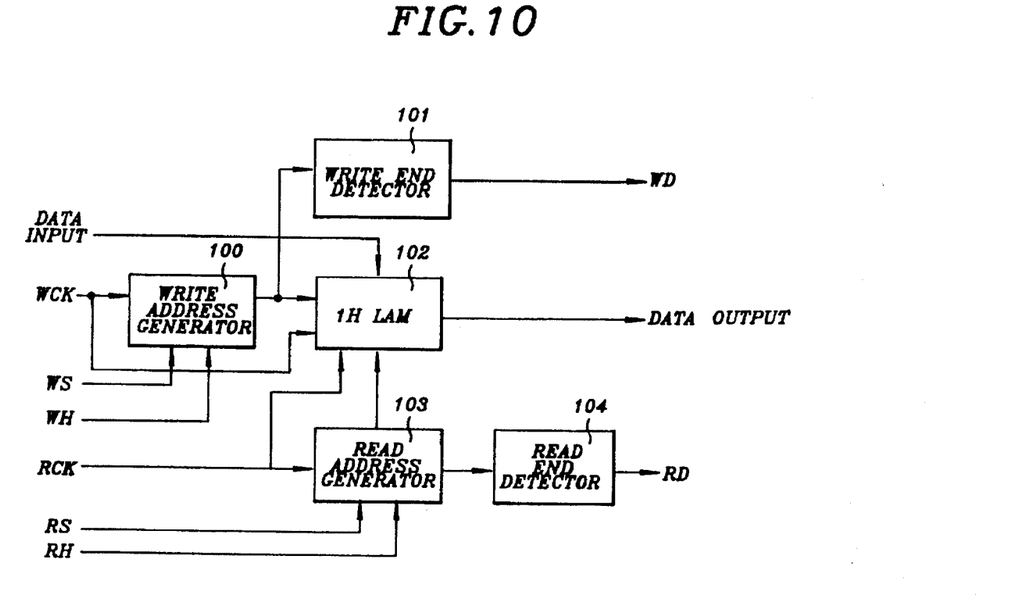
FIG. 10 is a detailed block diagram of the FIFO memory of FIG. 2.

FIFO memory 23 of FIG. 2 comprises, as shown in FIG. 10, a write address generator 100 for generating a write address according to write clock WCK output from write clock generator 33 and write address hold signal WH output from FIFO controller 24, a write end detector 101 for detecting an end address of the write address from the write address output from write address generator 100 and outputting a write end detection signal WD to FIFO controller 24, a read address generator 103 for generating a read address according to read detection clock RCK and read address hold signal RH output from FIFO controller 24, a read end detector 104 for detecting an end address of the read address from the read address output from read address generator 103 and outputting read end detection signal RD to FIFO controller 24, and a 1H RAM 102 for writing the digital video signal output from dropout corrector 22 according to the write address output from write address generator 100 and reading the signal according to the read address output from read address generator 103.

Here, read clock RCK is fixed in the first embodiment of the time base corrector for video signal of the present invention. In the second embodiment of the present invention, the read clock is output from read clock generator 38 of read timing generator 40.

The operation of FIFO memory 23 constructed as above will be explained below.

Write address generator 100 initializes the write address as "0" by write reset signal WS output from FIFO controller 24, and thereafter increments the write address by one for every write clock WCK so as to supply a corresponding write address of digital video data input to 1H RAM 102. This allows the video data to be stored in 1H RAM 102.

Meanwhile, if write address hold signal WH is input from FIFO controller 24, write address generator 100 stops the increment of address even when write clock WCK is input. Here, if write end of address of 1H RAM 102 is detected from the output of write address generator 100, write end detector 101 outputs write end detection signal WD to FIFO controller 24.

After the write end address, write address generator 100 becomes "0" and repeats the increment of write address for every write clock WCK.

Read address generator 103 initializes the read address as "0" by read reset signal RS output from FIFO controller 24, and thereafter increments the read address by one whenever read clock RCK is input so that a corresponding read address of the output data is supplied to 1H RAM 102. This allows the video data stored in 1H RAM 102 to be output.

When read address hold signal RH is input from FIFO controller 24, read address generator 103 stops the increment of the read address even though read clock RCK is input. Here, when the read end of address of 1H RAM 102 is detected from the output of read address generator 103, read end detector 104 outputs read end detection signal RD to FIFO controller 24.

After the read end address, read address generator 103 becomes "0" and repeats the increment of the read address for every read clock RCK.

Figure 11:
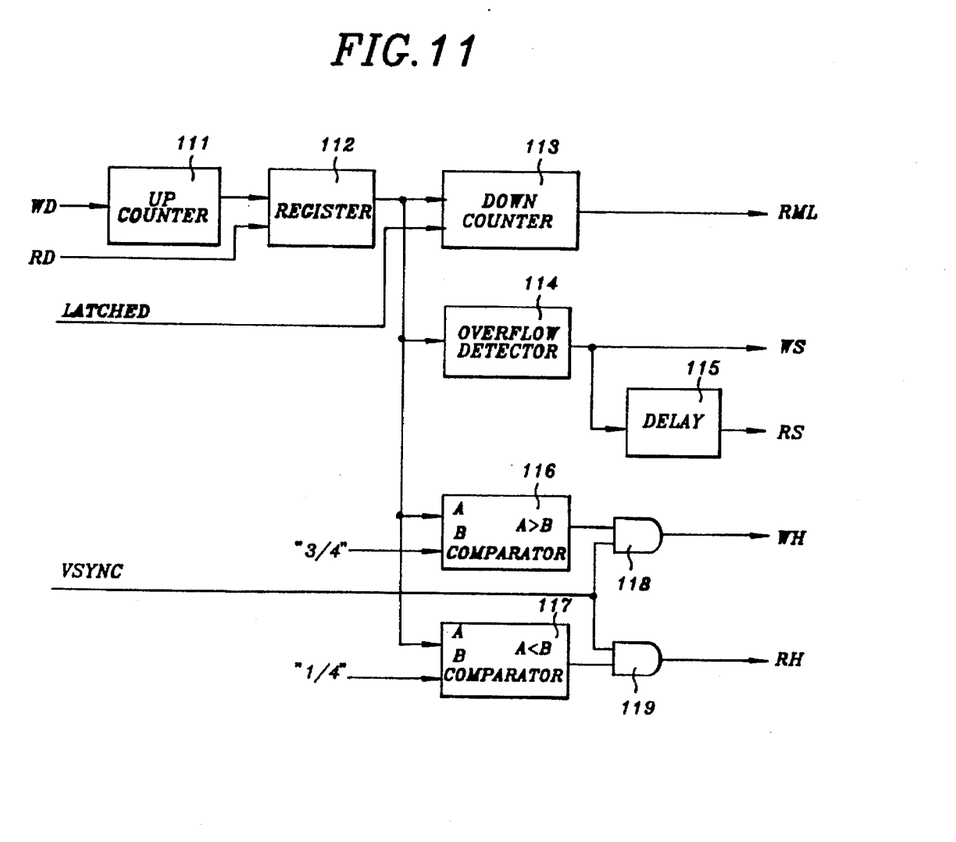
FIG. 11 is a detailed block diagram of the FIFO controller of FIG. 2.

FIFO controller 24, which controls the operation of FIFO memory 23, of the first embodiment of the time base corrector for video signal of the present invention comprises, as shown in FIG. 11, an up counter 111 for counting up write end detection signal WD output from write end detector 101, a register 112 for storing the signal output from up counter 111 by taking read end detection signal RD output from read end detector 104 as an enable signal, an overflow detector 114 for outputting write reset signal WS to FIFO memory 23 when the signal output from register 112 becomes "0," a delay portion 115 for outputting read reset signal RS in which write reset signal WS output from overflow detector 114 is delayed for 0.5 H, to FIFO memory 23, a comparator 116 for comparing the signal output from register 112 with a corresponding reference value, a comparator 117 for comparing the signal output from register 112 with a corresponding reference value, an AND gate 118 for logically multiplying the output signal of comparator 116 by the vertical sync signal and outputting write address hold signal WH to FIFO memory 23, and an AND gate 119 for logically multiplying the output signal of comparator 117 by the vertical sync signal and outputting read address hold signal RH to FIFO memory 23.

FIFO controller 24 for controlling the operation of FIFO memory 23, of the second embodiment of the time base corrector for video signal of the present invention is constructed to have a down counter 113 in FIFO controller 24 of the first embodiment of the time base corrector for video signal of the present invention.

Specifically, FIFO controller 24 of the second embodiment comprises a up counter 111 for counting up write end detection signal WD output from write end detector 101, a register 112 for storing the signal output from up counter 111 by taking read end detection signal RD output from read end detector 104 as an enable signal, a down counter 113 for counting down the signal output from register 112 and outputting timing control signal RML to read timing generator 40, an overflow detector 114 for outputting write reset signal WS to FIFO memory 23 when the signal output from register 112 becomes "0," a delay portion 115 for outputting read reset signal RS in which write reset signal WS output from overflow detector 114 is delayed for 0.5 H, to FIFO memory 23, a comparator 116 for comparing the signal output from register 112 with a corresponding reference value, a comparator 117 for comparing the signal output from register 112 with a corresponding reference value, an AND gate 118 for logically multiplying the output signal of comparator 116 by the vertical sync signal and outputting write address hold signal WH to FIFO memory 23, and an AND gate 119 for logically multiplying the output signal of comparator 117 by the vertical sync signal and outputting read address hold signal RH to FIFO memory 23.

The operation of FIFO controller 24 will be explained below.

Up counter 11 is loaded as "0" when write end detection signal WD is input from write end detector 101 to start counting up. Counting values are latched to register 112 as read end detection signal RD output from read end detector 104 is input.

For FIFO controller 24 of the second embodiment of the time base corrector for video signal of the present invention, the values latched to register 112 are input to down counter 113 and counted down. When the down count value is "0," timing control signal RML for read clock modulation, that is, a modulation latch signal, is output to latch 36 of read timing generator 40 so as to conform the modulation timing of the read clock.

When the output value of register 112 is closer to "0" or 1H so that there might be, undesirably, caused an overflow, overflow detector 114 outputs write address reset signal WS to FIFO memory 23. Write address reset signal WS is delayed for 0.5 H in delay portion 115 to form read address reset signal RS which then is output to FIFO memory 23. Therefore, write end detection signal WD and read end detection signal RD maintain the interval of 0.5 H.

Comparator 116 compares the output value of register 112 with reference value 3H/4 so that when the interval between write end detection signal WD and read end detection signal RD reaches 3H/4, write address hold signal WH is output. Write address hold signal WH output from comparator 116 is output when the vertical sync signal is input to AND gate 118. The write address hold signal is output to FIFO memory 23 for the vertical sync section.

Comparator 117 compares the output value of register 112 with reference value 1H/4 so that when the interval between write end detection signal WD and read end detection signal RD reaches 1H/4, read address hold signal RH is output. Read address hold signal RH output from comparator 117 is output when the vertical sync signal is input to AND gate 119. The read address hold signal is output to FIFO memory 23 for the vertical sync section.

Write address hold signal WH or read address hold signal RH is supplied to write address generator 100 or read address generator 103 of FIFO memory 23 of FIG. 10 so that when the interval between write end detection signal WD and read end detection signal RD cannot maintain a predetermined range, in other words, a range from 1H/4 to 3H/4, overflow detector 114 outputs write reset signal WS and read reset signal RS to FIFO memory 23 so as to initialize and control the memory.

As described above, in the present invention, a phase-locked loop is formed for the chroma carrier of a video signal so that a difficulty in detecting a phase error from a horizontal sync signal at an accuracy similar to the chroma carrier in the vertical sync section having no chroma carrier and complexity of hardware in which the phase difference between the horizontal sync and chroma carrier should be considered are overcome by employing a high gain loop filter and a clearing operation. Further, a read clock modulation is performed exactly at a time delayed in the FIFO memory according to a speed error generated in one line, using properties in which frequency variation corresponds to phase integration in one line in the frequency conversion characteristic of the digital timing oscillator. This simplifies the read clock phase modulator.

What is claimed is:

1. A time base corrector for video signal comprising:

an A/D converter for digitally converting an input analog video signal with a sampling clock which is a predetermined number of times the frequency of a chroma carrier signal;

a dropout corrector for correcting the dropout of the digital video signal output from said A/D converter;

a write timing generator for filtering the chroma carrier phase error according to the horizontal sync phase error of the digital video signal output from said A/D converter and generating a write clock which is then output as a sampling clock of said A/D converter;

a FIFO memory for storing the digital video signal output from said dropout corrector according to said write clock output from said write timing generator and outputting the signal according to a read clock;

a FIFO controller for controlling the read/write timing of said FIFO memory; and a D/A converter for converting the video signal output from said FIFO memory into an analog video signal.

2. A time base corrector for video signal as claimed in claim 1, wherein said read clock is fixed to 4 fsc frequency.

3. A time base corrector for video signal as claimed in claim 1, wherein said write clock is 4 fsc frequency.

4. A time base corrector for video signal as claimed in claim 3, wherein said write timing generator comprises:

a horizontal sync phase error detector for detecting the horizontal sync phase error of the digital video signal output from said A/D converter and outputting a control signal indicating that the error between serial horizontal lines falls within a predetermined range;

a sync separator for separating the horizontal sync signal and vertical sync signal of the digital video signal output from said A/D converter and generating a timing signal indicating that a chroma carrier starts;

a chroma carrier phase error detector for detecting a phase error between the chroma carrier and the sampling clock of the digital video signal output from said A/D converter by using said timing signal output from said sync separator;

a phase error detector for outputting "0" during a vertical sync period and selecting and outputting the signal output from said chroma carrier phase error detector out of the vertical sync period, according to the vertical sync signal output from said sync separator;

a loop filter cleared according to said control signal output from said horizontal sync phase error detector and for filtering the signal output from said phase error detector;

a switching portion for selecting one of the signals output from said phase error detector and said loop filter according to said control signal output from said horizontal sync error detector;

a timing oscillator for performing frequency conversion according to the signal output from said switching portion and providing a write clock timing; and a write clock generator for generating a write clock according to the signal output from said timing oscillator and outputting the clock as the sampling clock of said A/D converter and as the write clock of said FIFO memory.

5. A time base corrector for video signal as claimed in claim 4, further comprising a read timing generator for compensating for a speed error according to the horizontal sync signal output from said sync separator under the control of said FIFO controller and the signal output from said phase error detector and modulating and outputting said read clock to said FIFO memory and D/A converter.

6. A time base corrector for video signal as claimed in claim 5, wherein said read timing generator comprises:

a first latch for storing a phase error previous to 1H output from said phase error detector according to said horizontal sync signal output from said sync separator;

a subtractor for subtracting the present phase error output from said phase error detector from the 1H-preceding phase error output from said first latch;

a second latch for latching the signal output from said subtractor under the control of said FIFO controller and storing a phase error between lines;

a digital timing oscillator for performing frequency conversion according to the signal output from said second latch and providing a read clock timing; and a read clock generator for generating a read clock under the control of the signal output from said digital timing oscillator and outputting the clock as the read clock of said FIFO memory and as the sampling clock of said D/A converter.

7. A time base corrector for video signal as claimed in claim 4, wherein said loop filter is formed with an infinite impulse response filter.

8. A time base corrector for video signal as claimed in claim 5, wherein said loop filter is formed with an infinite impulse response filter.

9. A time base corrector for video signal as claimed in claim 4, wherein said chroma carrier phase error detector comprises:

a pulse detector for generating first and second sine and cosine sample pulse signals sequentially delayed from said timing signal output from said sync separator and the sampling clock of said A/D converter; and a phase error detector for operating said first and second sine and cosine sample pulse signals output from said pulse detector and obtaining sine and cosine phase differences to thereby generate a final phase error between the digital chroma carrier and sampling clock output from said A/D converter.

10. A time base corrector for video signal as claimed in claim 9, wherein said pulse detector comprises:

a reference pulse generator for dividing said sampling clock of said A/D converter by four and generating a reference chroma carrier signal;

a counter for counting said reference chroma carrier signal output from said reference pulse generator for every six periods;

a first flip-flop for receiving the signal output from said counter and said timing signal output from said sync separator and outputting a section pulse signal indicative of a section during which the error is detected;

an AND gate for logically multiplying said section pulse signal output from said first flip-flop by said reference chroma carrier signal output from said reference pulse generator and outputting a first sine sample pulse signal;

a second flip-flop for delaying said first sine sample pulse signal output from said AND gate for one clock and outputting a first cosine sample pulse signal;

a third flip-flop for delaying said first cosine sample pulse signal output from said second flip-flop for one clock and outputting said second sine sample pulse signal; and a fourth flip-flop for delaying said second sine sample pulse signal output from said third flip-flop for one clock and outputting said second cosine sample pulse signal.

11. A time base corrector for video signal as claimed in claim 9, wherein said phase error detector comprises:

a first register for storing the digital chroma carrier sine sample output from said A/D converter according to said first sine sample pulse signal output from said pulse detector;

a second register for storing the digital chroma carrier cosine sample output from said A/D converter according to said first cosine sample pulse signal output from said pulse detector;

a third register for storing the digital chroma carrier sine sample output from said A/D converter according to said second sine sample pulse signal output from said pulse detector;

a fourth register for storing the digital chroma carrier cosine sample output from said A/D converter according to said second cosine sample pulse signal output from said pulse detector;

a first subtractor for subtracting the output from said third register from the output from said first register;

a second subtractor for subtracting the output of said fourth register from the output of said second register;

a first adder for adding the output of first subtractor as one input;

a second adder for adding the output of said second subtractor as one input;

a sine register for storing the output of said first adder and outputting it as the other input of said first adder;

a cosine register for storing the output of said second adder and outputting it as the other input of said second adder;

an operator for dividing the output of said sine register and the output of said cosine register and converting the result into a tangent value; and an error memory for calculating and storing a final error value by using the output of said operator.

12. A time base corrector for video signal as claimed in claim 5, wherein said chroma carrier phase error detector comprises:

a pulse detector for generating first and second sine and cosine sample pulse signals sequentially delayed from said timing signal output from said sync separator and the sampling clock of said A/D converter; and a phase error detector for operating said first and second sine and cosine sample pulse signals output from said pulse detector and obtaining sine and cosine phase differences to thereby generate a final phase error between the digital chroma carrier and sampling clock output from said A/D converter.

13. A time base corrector for video signal as claimed in claim 12, wherein said pulse detector comprises:

a reference pulse generator for dividing said sampling clock of said A/D converter by four and generating a reference chroma carrier signal;

a counter for counting said reference chroma carrier signal output from said reference pulse generator for every six periods;

a first flip-flop for receiving the signal output from said counter and said timing signal output from said sync separator and outputting a section pulse signal indicative of a section during which the error is detected;

an AND gate for logically multiplying said section pulse signal output from said first flip-flop by said reference chroma carrier signal output from said reference pulse generator and outputting a first sine sample pulse signal;

a second flip-flop for delaying said first sine sample pulse signal output from said AND gate for one clock and outputting a first cosine sample pulse signal;

a third flip-flop for delaying said first cosine sample pulse signal output from said second flip-flop for one clock and outputting said second sine sample pulse signal; and a fourth flip-flop for delaying said second sine sample pulse signal output from said third flip-flop for one clock and outputting said second cosine sample pulse signal.

14. A time base corrector for video signal as claimed in claim 12, wherein said phase error detector comprises:

a first register for storing the digital chroma carrier sine sample output from said A/D converter according to said first sine sample pulse signal output from said pulse detector;

a second register for storing the digital chroma carrier cosine sample output from said A/D converter according to said first cosine sample pulse signal output from said pulse detector;

a third register for storing the digital chroma carrier sine sample output from said A/D converter according to said second sine sample pulse signal output from said pulse detector;

a fourth register for storing the digital chroma carrier cosine sample output from said A/D converter according to said second cosine sample pulse signal output from said pulse detector;

a first subtractor for subtracting the output from said third register from the output from said first register;

a second subtractor for subtracting the output of said fourth register from the output of said second register;

a first adder for adding the output of first subtractor as one input;

a second adder for adding the output of said second subtractor as one input;

a sine register for storing the output of said first adder and outputting it as the other input of said first adder;

a cosine register for storing the output of said second adder and outputting it as the other input of said second adder;

an operator for dividing the output of said sine register and the output of said cosine register and converting the result into a tangent value; and an error memory for calculating and storing a final error value by using the output of said operator.

15. A time base corrector for video signal as claimed in claim 4, wherein said horizontal sync phase error detector comprises:

a horizontal sync low-pass filter for performing the low-pass filtering the horizontal sync signal with respect to the digital video signal output from said A/D converter; and an error discriminator for receiving the signal output from said horizontal sync low-pass filter and detecting the horizontal sync phase error to thereby decide whether the error falls within a permissible range or not and to output said control signal.

16. A time base corrector for video signal as claimed in claim 15, wherein said horizontal sync low-pass filter is formed with a fifth finite impulse response filter.

17. A time base corrector for video signal as claimed in claim 16, wherein said horizontal sync low-pass filter comprises:

a first register for storing and delaying the horizontal sync signal of the digital video signal output from said A/D converter;

a second register for storing and delaying the horizontal sync signal output from said first register;

a third register for storing and delaying the horizontal sync signal output from said second register;

a fourth register for storing and delaying the horizontal sync signal output from said third register;

a first tab counter for multiplying the horizontal sync signal of the digital video signal output from said A/D converter by a predetermined constant;

a second tab counter for multiplying the horizontal sync signal output from said first register by a predetermined constant;

a third tab counter for multiplying the horizontal sync signal output from said second register by a predetermined constant;

a fourth tab counter for multiplying the horizontal sync signal output from said third register by a predetermined constant;

a fifth tab counter for multiplying the horizontal sync signal output from said fourth register by a predetermined constant; and an adder for adding the signals output from said first-fifth tab counters and outputting the added signals to said error discriminator.

18. A time base corrector for video signal as claimed in claim 15, wherein said error discriminator comprises:

an input comparator for comparing the signal output from said horizontal sync low-pass filter with a reference sample value;

a first register for storing the signal output from said horizontal sync low-pass filter by taking the signal output from said input comparator as an enable signal;

a second register for storing the signal output from said first register by taking the signal output from said input comparator as an enable signal;

a subtractor for subtracting the output of said first register from the output from said second register;

a multiplier for multiplying the output of said subtractor by a predetermined constant;

a horizontal sync phase integer detector for counting the signal output from said input comparator and detecting a horizontal sync phase integer;

an adder for adding the output of said multiplier to the output of said horizontal sync detector and outputting a horizontal error; and an output comparator for outputting said control signal in which the output of said adder is compared with a reference value of permissible error to said switching portion and loop filter.

19. A time base corrector for video signal as claimed in claim 5, wherein said horizontal sync phase error detector comprises:

a horizontal sync low-pass filter for performing the low-pass filtering the horizontal sync signal with respect to the digital video signal output from said A/D converter; and an error discriminator for receiving the signal output from said horizontal sync low-pass filter and detecting the horizontal sync phase error to thereby decide whether the error falls within a permissible range or not and to output said control signal.

20. A time base corrector for video signal as claimed in claim 19, wherein said horizontal sync low-pass filter is formed with a fifth finite impulse response filter.

21. A time base corrector for video signal as claimed in claim 20, wherein said horizontal sync low-pass filter comprises:

a first register for storing and delaying the horizontal sync signal of the digital video signal output from said A/D converter;

a second register for storing and delaying the horizontal sync signal output from said first register;

a third register for storing and delaying the horizontal sync signal output from said second register;

a fourth register for storing and delaying the horizontal sync signal output from said third register;

a first tab counter for multiplying the horizontal sync signal of the digital video signal output from said A/D converter by a predetermined constant;

a second tab counter for multiplying the horizontal sync signal output from said first register by a predetermined constant;

a third tab counter for multiplying the horizontal sync signal output from said second register by a predetermined constant;

a fourth tab counter for multiplying the horizontal sync signal output from said third register by a predetermined constant;

a fifth tab counter for multiplying the horizontal sync signal output from said fourth register by a predetermined constant; and an adder for adding the signals output from said first-fifth tab counters and outputting the added signals to said error discriminator.

22. A time base corrector for video signal as claimed in claim 19, wherein said error discriminator comprises:

an input comparator for comparing the signal output from said horizontal sync low-pass filter with a reference sample value;

a first register for storing the signal output from said horizontal sync low-pass filter by taking the signal output from said input comparator as an enable signal;

a second register for storing the signal output from said first register by taking the signal output from said input comparator as an enable signal;

a subtractor for subtracting the output of said first register from the output from said second register;

a multiplier for multiplying the output of said subtractor by a predetermined constant;

a horizontal sync phase integer detector for counting the signal output from said input comparator and detecting a horizontal sync phase integer;

an adder for adding the output of said multiplier to the output of said horizontal sync detector and outputting a horizontal error; and an output comparator for outputting said control signal in which the output of said adder is compared with a reference value of permissible error to said switching portion and loop filter.

23. A time base corrector for video signal as claimed in claim 7, wherein said loop filter comprises:

a first multiplier for multiplying the signal output from said phase error detector by a predetermined constant;

a first adder for adding the signal output from said phase error detector as one input;

a first register cleared according to said control signal output from said horizontal sync phase error detector and for storing and delaying the output of said first adder for a predetermined time and outputting the delayed result to the other input of said first adder;

a second adder for adding the output of said first multiplier to the output of said first adder;

a second multiplier for multiplying the output of said second adder by a predetermined constant;

a third adder for adding the output of said second adder as one input;

a second register cleared according to said control signal output from said horizontal sync phase error detector and for storing and delaying the output of said third adder for a predetermined time and outputting the delayed result to the other input of said third adder;

a fourth adder for adding the output of said second multiplier to the output of said third adder; and a third multiplier for multiplying the output of said fourth adder by a predetermined constant and the multiplied result to said switching portion.

24. A time base corrector for video signal as claimed in claim 8, wherein said loop filter comprises:

a first multiplier for multiplying the signal output from said phase error detector by a predetermined constant;

a first adder for adding the signal output from said phase error detector as one input;

a first register cleared according to said control signal output from said horizontal sync phase error detector and for storing and delaying the output of said first adder for a predetermined time and outputting the delayed result to the other input of said first adder;

a second adder for adding the output of said first multiplier to the output of said first adder;

a second multiplier for multiplying the output of said second adder by a predetermined constant;

a third adder for adding the output of said second adder as one input;

a second register cleared according to said control signal output from said horizontal sync phase error detector and for storing and delaying the output of said third adder for a predetermined time and outputting the delayed result to the other input of said third adder;

a fourth adder for adding the output of said second multiplier to the output of said third adder; and a third multiplier for multiplying the output of said fourth adder by a predetermined constant and the multiplied result to said switching portion.

25. A time base corrector for video signal as claimed in claim 4, wherein said FIFO memory comprises:

a write address generator for generating a write address according to said write clock output from said write clock generator and write address hold signal output from said FIFO controller;

a write end detector for detecting an end address of the write address from the write address output from said write address generator and outputting a write end detection signal to said FIFO controller;

a read address generator for generating a read address according to said read clock and read address hold signal output from said FIFO controller;

a read end detector for detecting an end address of the read address from the read address output from said read address generator and outputting said read end detection signal to said FIFO controller; and a 1H RAM for writing the digital video signal output from said dropout corrector according to the write address output from said write address generator and reading the signal according to the read address output from said read address generator.

26. A time base corrector for video signal as claimed in claim 5, wherein said FIFO memory comprises:

a write address generator for generating a write address according to said write clock output from said write clock generator and write address hold signal output from said FIFO controller;

a write end detector for detecting an end address of the write address from the write address output from said write address generator and outputting a write end detection signal to said FIFO controller;

a read address generator for generating a read address according to said read clock and read address hold signal output from said FIFO controller;

a read end detector for detecting an end address of the read address from the read address output from said read address generator and outputting said read end detection signal to said FIFO controller; and a 1H RAM for writing the digital video signal output from said dropout corrector according to the write address output from said write address generator and reading the signal according to the read address output from said read address generator.

27. A time base corrector for video signal as claimed in claim 25, wherein said FIFO controller comprises:

an up counter for counting up said write end detection signal output from said write end detector;

a register for storing the signal output from said up counter by taking said read end detection signal output from said read end detector as an enable signal;

an overflow detector for outputting a write reset signal to said FIFO memory when the signal output from said register becomes "0";

a delay portion in which said write reset signal output from said overflow detector is delayed for 0.5 H, to form a read reset signal which is then output to said FIFO memory;

a first comparator for comparing the signal output from said register with a second corresponding reference value;

a second comparator for comparing the signal output from said register with a corresponding reference value;

a first AND gate for logically multiplying the output signal of said first comparator by the vertical sync signal and outputting said write address hold signal to said FIFO memory; and a second AND gate for logically multiplying the output signal of said second comparator by the vertical sync signal and outputting said read address hold signal to said FIFO memory.

* * * * *